United States Patent
Gan et al.

(10) Patent No.: US 10,986,572 B2
(45) Date of Patent: Apr. 20, 2021

(54) DEVICE AND METHOD OF TRANSMITTING WAKE-UP FRAMES

(71) Applicant: Huawei Technologies Co., Ltd., Guangdong (CN)

(72) Inventors: Ming Gan, Shenzhen (CN); Jia Jia, Shenzhen (CN); Jian Yu, Shenzhen (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/397,995

(22) Filed: Apr. 29, 2019

(65) Prior Publication Data
US 2019/0261272 A1   Aug. 22, 2019

Related U.S. Application Data

(63) Continuation of application No. PCT/CN2017/104387, filed on Sep. 29, 2017.

(30) Foreign Application Priority Data

Oct. 31, 2016 (CN) .......... 201610978042.1

(51) Int. Cl.
 *H04W 52/02* (2009.01)
 *H04L 5/00* (2006.01)
 *H04W 84/12* (2009.01)

(52) U.S. Cl.
 CPC ....... *H04W 52/0216* (2013.01); *H04L 5/0055* (2013.01); *H04W 52/02* (2013.01);
 (Continued)

(58) Field of Classification Search
 CPC ......... H04W 52/0216; H04W 52/0235; H04W 52/02; H04W 84/12; H04W 52/0229; H04L 5/0055; Y02D 70/20; Y02D 70/00
 See application file for complete search history.

(56) References Cited

U.S. PATENT DOCUMENTS

| | | | |
|---|---|---|---|
| 9,596,651 B2 * | 3/2017 | Jafarian et al. | |
| 2011/0074552 A1 | 3/2011 | Norair et al. | |

(Continued)

FOREIGN PATENT DOCUMENTS

| | | |
|---|---|---|
| CN | 102938928 A | 2/2013 |
| CN | 104301973 A | 1/2015 |

(Continued)

*Primary Examiner* — Ian N Moore
*Assistant Examiner* — Rushil Parimal Sampat
(74) *Attorney, Agent, or Firm* — Hauptman Ham, LLP

(57) ABSTRACT

This application relates to the wireless communications field and provides a frame transmission method, device, and system. The method includes: sending, by a second device, n wake-up frames to a first device, where the n wake-up frames each carry segmented content of wake-up signaling, so that a wake-up receiver of the first device wakes up a main transceiver of the first device based on the n wake-up frames, and after being woken up, the main transceiver sends, to the second device, a response frame used to indicate whether the n wake-up frames are correctly received. In this application, content of the wake-up signaling is segmented. In this case, lengths of the n wake-up frames are all relatively short, so that the wake-up receiver is easier to correctly receive each wake-up frame.

11 Claims, 7 Drawing Sheets

(52) U.S. Cl.
CPC ........ *H04W 52/0235* (2013.01); *H04W 84/12* (2013.01); *Y02D 30/70* (2020.08)

(56) References Cited

U.S. PATENT DOCUMENTS

| | | |
|---|---|---|
| 2014/0126442 A1 | 5/2014 | Jafarian et al. |
| 2015/0245290 A1 | 8/2015 | Liu |
| 2016/0198417 A1 | 7/2016 | Park et al. |
| 2016/0295511 A1 | 10/2016 | Qi et al. |

FOREIGN PATENT DOCUMENTS

| | | |
|---|---|---|
| CN | 104838700 A | 8/2015 |
| CN | 104917619 A | 9/2015 |
| CN | 105723780 A | 6/2016 |
| CN | 106604377 A | 4/2017 |

\* cited by examiner

DEVICE AND METHOD OF TRANSMITTING WAKE-UP FRAMES

CROSS-REFERENCE TO RELATED APPLICATIONS

This application is a continuation of International Application No. PCT/CN2017/104387, filed on Sep. 29, 2017, which claims priority to Chinese Patent Application No. 201610978042.1, filed on Oct. 31, 2016. The disclosures of the aforementioned applications are hereby incorporated by reference in their entireties.

TECHNICAL FIELD

This application relates to the field of wireless communications, and in particular, to a frame transmission method, device, and system.

BACKGROUND

With development of science and technologies, communication performed through a wireless local area network becomes more popular in people's life. A device capable of performing communication through a wireless local area network usually includes a main transceiver that can send and receive data. In actual application, to reduce power consumption of the device, the main transceiver may enter a sleep state when the main transceiver does not send and receive data. In addition, when data needs to be received and sent, to enable the main transceiver to be woken up, that is, to be switched from the sleep state to a working state, a wake-up receiver may be further provided in the device. The wake-up receiver may enter a working state when the main transceiver is in the sleep state. The wake-up receiver may receive a wake-up frame sent by another device, and wake up the main transceiver after receiving the wake-up frame, in other words, control the main transceiver to switch from the sleep state to the working state. In this way, first, the main transceiver can be woken up in time, and data reception and transmission latencies are reduced; second, a circuit structure of the wake-up receiver is simple, and therefore power consumption of the wake-up receiver in the working state is far lower than that of the main transceiver, so that power consumption of the device can be reduced.

In a related technology, the other device may send the wake-up frame to the wake-up receiver. The wake-up frame may carry wake-up signaling, and the wake-up signaling may include a timestamp, wake-up time, a wake-up cycle, a main-transceiver receive working mode (such as a quantity of received streams and receive bandwidth), a channel number, and the like. The wake-up receiver may wake up the main transceiver based on the received wake-up frame, and the main transceiver may send and receive data based on parameters for data reception and transmission in the wake-up frame. If the wake-up frame is not correctly received by the wake-up receiver, the other device needs to retransmit the wake-up frame to the wake-up receiver.

In a process of implementing this application, the inventor finds that the prior art has at least the following problems: Wake-up signaling carried in a wake-up frame includes much content, and therefore the wake-up frame has a relatively long length. This causes that a wake-up receiver easily fails to correctly receive the wake-up frame. If the wake-up receiver does not correctly receive the wake-up frame, another device needs to retransmit the wake-up frame. Consequently, not only a relatively long transmission time needs to be consumed, but also the retransmitted wake-up frame very possibly fails to be correctly received. As a result, the existing wake-up frame has relatively weak robustness.

SUMMARY

To resolve a prior-art problem that a wake-up frame has relatively weak robustness, this application provides a frame transmission method. The technical solution is as follows.

According to a first aspect, a frame transmission method is provided, where the method is applied to a first device on a wireless local area network, the first device includes a main transceiver and a wake-up receiver, and the method includes:

receiving, by the wake-up receiver, n wake-up frames that are sent by a second device on the wireless local area network, where each wake-up frame is used to instruct the wake-up receiver to wake up the main transceiver, and n is a positive integer greater than or equal to 1; and sending, by the main transceiver, a response frame to the second device after being woken up, where the response frame is used to indicate whether each of the n wake-up frames is correctly received by the wake-up receiver.

In conclusion, the first device may receive the n wake-up frames sent by the second device, and the n wake-up frames each carry segmented content of wake-up signaling; after receiving any one of the n wake-up frames, the wake-up receiver of the first device wakes up the main transceiver of the first device; and the main transceiver sends the response frame to the second device after being woken up. The n wake-up frames each carry the segmented content of the wake-up signaling. In this way, first, lengths of all the n wake-up frames are relatively short, so that the wake-up receiver is easier to correctly receive the n wake-up frames. Second, when there is a wake-up frame of the n wake-up frames that is not correctly received by the wake-up receiver, the wake-up receiver can still wake up the main transceiver based on a correctly received wake-up frame, so as to ensure that the main transceiver can be woken up in time, thereby reducing a data transmission latency. Third, when there is a wake-up frame of the n wake-up frames that is not correctly received by the wake-up receiver, the second device may send, based on the response frame sent by the first device, only wake-up signaling included in the wake-up frame that is not correctly received, thereby reducing network bandwidth. This improves wake-up frame robustness.

Each wake-up frame includes a segment number, and the segment number is used to indicate an order of the wake-up frame among the n wake-up frames.

In addition, each wake-up frame includes a segment indication identifier, and the segment indication identifier is used to indicate whether n is equal to 1.

In this application, four types of possible response frames are provided. Details are as follows:

Type 1: The response frame is an acknowledgment ACK frame, and the ACK frame includes a frame control field, a duration field, a receiver address, and an FCS; and the duration field includes a segment bitmap, and the segment bitmap is used to indicate whether each of the n wake-up frames is correctly received by the wake-up receiver. The frame control field includes a frame type identifier, and the frame type identifier is used to indicate that the ACK frame is the response frame.

Type 2: The response frame is a block acknowledgment frame, the block acknowledgment frame includes a frame control field, a duration field, a receiver address, a transmitter address, a block acknowledgment control field, a starting sequence control field, a block acknowledgment bitmap field, and an FCS, and the starting sequence control field includes a fragment indication field and a starting sequence field; and the starting sequence field or the block acknowledgment bitmap field includes a segment bitmap, and the segment bitmap is used to indicate whether each of the n wake-up frames is correctly received by the wake-up receiver. The fragment indication field or the block acknowledgment control field includes a frame type identifier, and the frame type identifier is used to indicate that the block acknowledgment frame is the response frame.

Type 3: The response frame is a data frame including a high throughput HT-control field, the HT-control field includes a very high throughput VHT field, a high efficiency HE field, and a plurality of control fields, and each of the plurality of control fields includes a control identifier and corresponding control information; and the control information includes a segment bitmap, and the segment bitmap is used to indicate whether each of the n wake-up frames is correctly received by the wake-up receiver. The control identifier includes a frame type identifier, and the frame type identifier is used to indicate that the data frame is the response frame.

Type 4: The response frame is a wake-up acknowledgment frame, the wake-up acknowledgment frame includes a legacy preamble, a wake-up preamble, a frame type identifier, a receive end identifier, a segment bitmap, and a check bit, the frame type identifier is used to indicate that the wake-up acknowledgment frame is the response frame, and the segment bitmap is used to indicate whether each of the n wake-up frames is correctly received by the wake-up receiver.

First three types of the four types of response frames are all data frames defined by wireless local area network standards. These three types of data frames are used in this application to indicate whether each of the n wake-up frames is correctly received by the wake-up receiver. In this way, the response frame in this application can be adaptable to an existing wireless local area network standard, and commonality of the response frame is ensured.

This application further provides two methods for waking up the main transceiver. Details are as follows:

Method 1: The wake-up receiver wakes up the main transceiver after correctly receiving any one of the n wake-up frames.

Method 2: The wake-up receiver wakes up the main transceiver after correctly receiving the last one of the n wake-up frames.

According to a second aspect, a frame transmission method is provided, where the method is applied to a second device on a wireless local area network, and the method includes:

sending n wake-up frames to a wake-up receiver of a first device on the wireless local area network, where each wake-up frame is used to instruct the wake-up receiver to wake up a main transceiver of the first device, and n is a positive integer greater than or equal to 1; and receiving a response frame sent by the first device, where the response frame is used to indicate whether each of the n wake-up frames is correctly received by the wake-up receiver.

In conclusion, the second device may segment content of wake-up signaling and send the n wake-up frames to the first device, and the n wake-up frames each carry segmented content of the wake-up signaling, so that after receiving any one of the n wake-up frames, the wake-up receiver of the first device wakes up the main transceiver of the first device, and the main transceiver sends the response frame to the second device after being woken up. The n wake-up frames each carry the segmented content of the wake-up signaling. In this way, first, lengths of all the n wake-up frames are relatively short, so that the wake-up receiver is easier to correctly receive the n wake-up frames. Second, when there is a wake-up frame of the n wake-up frames that is not correctly received by the wake-up receiver, the wake-up receiver can still wake up the main transceiver based on a correctly received wake-up frame, so as to ensure that the main transceiver can be woken up in time, thereby reducing a data transmission latency. Third, when there is a wake-up frame of the n wake-up frames that is not correctly received by the wake-up receiver, the second device may send, based on the response frame sent by the first device, only wake-up signaling included in the wake-up frame that is not correctly received, thereby reducing network bandwidth. This improves wake-up frame robustness.

Each wake-up frame includes a segment number, and the segment number is used to indicate an order of the wake-up frame among the n wake-up frames.

In addition, each wake-up frame includes a segment indication identifier, and the segment indication identifier is used to indicate whether n is equal to 1.

In this application, four types of possible response frames are provided. Details are as follows:

Type 1: The response frame is an acknowledgment ACK frame, and the ACK frame includes a frame control field, a duration field, a receiver address, and an FCS; and the duration field includes a segment bitmap, and the segment bitmap is used to indicate whether each of the n wake-up frames is correctly received by the wake-up receiver. The frame control field includes a frame type identifier, and the frame type identifier is used to indicate that the ACK frame is the response frame.

Type 2: The response frame is a block acknowledgment frame, the block acknowledgment frame includes a frame control field, a duration field, a receiver address, a transmitter address, a block acknowledgment control field, a starting sequence control field, a block acknowledgment bitmap field, and an FCS, and the starting sequence control field includes a fragment indication field and a starting sequence field; and the starting sequence field or the block acknowledgment bitmap field includes a segment bitmap, and the segment bitmap is used to indicate whether each of the n wake-up frames is correctly received by the wake-up receiver. The fragment indication field or the block acknowledgment control field includes a frame type identifier, and the frame type identifier is used to indicate that the block acknowledgment frame is the response frame.

Type 3: The response frame is a data frame including a high throughput HT-control field, the HT-control field includes a very high throughput VHT field, a high efficiency HE field, and a plurality of control fields, and each of the plurality of control fields includes a control identifier and corresponding control information; and the control information includes a segment bitmap, and the segment bitmap is used to indicate whether each of the n wake-up frames is correctly received by the wake-up receiver. The control identifier includes a frame type identifier, and the frame type identifier is used to indicate that the data frame is the response frame.

Type 4: The response frame is a wake-up acknowledgment frame, the wake-up acknowledgment frame includes a legacy preamble, a wake-up preamble, a frame type identifier, a receive end identifier, a segment bitmap, and a check bit, the frame type identifier is used to indicate that the wake-up acknowledgment frame is the response frame, and the segment bitmap is used to indicate whether each of the n wake-up frames is correctly received by the wake-up receiver.

First three types of the four types of response frames are all data frames defined by wireless local area network standards. These three types of data frames are used in this application to indicate whether each of the n wake-up frames is correctly received by the wake-up receiver. In this way, the response frame in this application can be adaptable to an existing wireless local area network standard, and commonality of the response frame is ensured.

In this application, the second device may alternatively send, to the first device based on the response frame, wake-up signaling carried in a wake-up frame of the n wake-up frames that is not correctly received.

According to a third aspect, a frame transmission method is provided, where the method is applied to a first device on a wireless local area network, the first device includes a main transceiver and a wake-up receiver, and the method includes:

receiving, by the wake-up receiver, a wake-up frame sent by a second device on the wireless local area network, where the wake-up frame includes a receive end identifier; and waking up, by the wake-up receiver, the main transceiver when the wake-up receiver correctly receives the receive end identifier in the wake-up frame and the receive end identifier is the same as an identifier of the first device.

In conclusion, the first device may wake up the main transceiver provided that the first device determines that the receive end identifier in the wake-up frame is correctly received by the wake-up receiver and that the receive end identifier is the same as the identifier of the first device, without considering whether another part of the wake-up frame is correctly received. In this way, even if the other part of the wake-up frame is not correctly received, the main transceiver can still be woken up in time, thereby reducing a data transmission latency.

This application provides two types of wake-up-frame frame structures. Details are as follows:

Type 1: The wake-up frame includes a legacy preamble, a wake-up preamble, a signaling field, a Media Access Control MAC header, a frame body, and a frame check sequence FCS; and the signaling field includes a wake-up identifier, a wireless access point AP identifier, and a cyclic redundancy check CRC of the signaling field, and the MAC header includes a frame type identifier and a receiver MAC address.

Type 2: The wake-up frame includes a legacy preamble, a wake-up preamble, a MAC header, a frame body, and an FCS, and the MAC header includes a frame type identifier, a receiver MAC address, and a CRC of the MAC header.

Based on the foregoing two types of wake-up-frame frame structures provided in this application, the following two methods may be used in this application to determine when to wake up the main transceiver. Details are as follows:

Method 1: The wake-up receiver wakes up the main transceiver when CRC check of the signaling field in the wake-up frame succeeds, the wake-up identifier in the wake-up frame is the same as a wake-up identifier of the first device, and an AP identifier in the wake-up frame is the same as an identifier of an AP associated with the first device.

Method 2: The wake-up receiver wakes up the main transceiver when CRC check of the MAC header in the wake-up frame succeeds and the receiver MAC address in the wake-up frame is the same as a MAC address of the first device.

In this application, the first device may further send a response frame to the second device after the main transceiver is woken up, where the response frame is used to indicate whether the wake-up frame is correctly received by the wake-up receiver.

The response frame is an acknowledgment ACK frame, a block acknowledgment frame, a data frame including a high throughput HT-control field, or a wake-up acknowledgment frame.

According to a fourth aspect, a frame transmission device is provided, where the frame transmission device is a device on a wireless local area network, and the frame transmission device includes a wake-up receiver and a main transceiver; and the wake-up receiver and the main transceiver are configured to implement the frame transmission method provided in any one of the first aspect or implementations of the first aspect.

According to a fifth aspect, a frame transmission device is provided, where the frame transmission device is a device on a wireless local area network, and the frame transmission device includes a transmitter and a receiver; and the transmitter and the receiver are configured to implement the frame transmission method provided in any one of the second aspect or implementations of the second aspect.

According to a sixth aspect, a frame transmission device is provided, where the frame transmission device is a device on a wireless local area network, and the frame transmission device includes a wake-up receiver and a main transceiver; and the wake-up receiver and the main transceiver are configured to implement the frame transmission method provided in any one of the third aspect or implementations of the third aspect.

According to a seventh aspect, a frame transmission system is provided, where the frame transmission system includes the frame transmission device according to the fourth aspect and the frame transmission device according to the fifth aspect.

Beneficial effects of the technical solutions provided in this application are as follows:

The first device receives the n wake-up frames sent by the second device, and the n wake-up frames each carry segmented content of wake-up signaling; after receiving any one of the n wake-up frames, the wake-up receiver of the first device wakes up the main transceiver of the first device; and the main transceiver sends the response frame to the second device after being woken up. The n wake-up frames each carry the segmented content of the wake-up signaling. In this way, first, lengths of all the n wake-up frames are relatively short, so that the wake-up receiver is easier to correctly receive the n wake-up frames. Second, when there is a wake-up frame of the n wake-up frames that is not correctly received by the wake-up receiver, the wake-up receiver can still wake up the main transceiver based on a correctly received wake-up frame, so as to ensure that the main transceiver can be woken up in time, thereby reducing a data transmission latency. Third, when there is a wake-up frame of the n wake-up frames that is not correctly received by the wake-up receiver, the second device may send, based on the response frame sent by the first device, only wake-up signaling included in the wake-up frame that is not correctly received, thereby reducing network bandwidth. This improves wake-up frame robustness.

DESCRIPTION OF EMBODIMENTS

Figure 1:
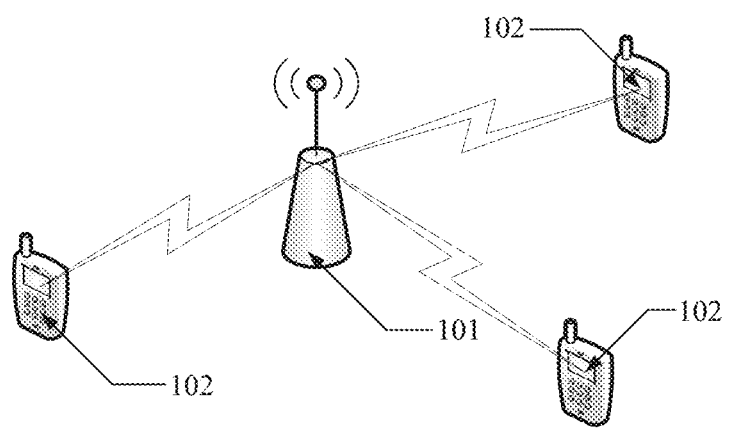
FIG. 1 is a schematic diagram of a networking mode of a wireless local area network according to an embodiment of the present disclosure.

To make the objectives, technical solutions, and advantages of this application clearer, the following further describes the implementations of this application in detail with reference to the accompanying drawings.

This application provides a frame transmission method that is applicable to transmission of a wake-up frame on a wireless local area network (WLAN). Currently, a standard used by the WLAN is the Institute of Electrical and Electronics Engineers (IEEE) 802.11 series. The WLAN may include a plurality of basic service sets (BSS), and a network node in the BSS is a station. A station includes an access point station (AP) and a non-access point station (Non-AP STA). Each basic service set may include one AP and a plurality of non-AP STAs associated with the AP. It should be noted that, a STA in the embodiments of the present disclosure is a non-access point station, and an AP in the embodiments of the present disclosure is an access point station.

The AP is also referred to as a wireless access point, a hotspot, or the like. The AP is an access point used by a mobile user to access a wired network, is mainly deployed at home, or inside a building or a campus, and has a typical coverage radius of tens to hundreds of meters. Certainly, the AP may alternatively be deployed outdoors. The AP is equivalent to a bridge connecting a wired network and a wireless network. Main functions of the AP are connecting wireless network clients together, and connecting the wireless network to the wired network. Specifically, the AP may be a terminal device or a network device having a Wireless Fidelity (Wi-Fi) chip. Optionally, the AP may be a device supporting the 802.11ax standard. Further, optionally, the AP may be a device supporting a plurality of WLAN standards such as 802.11ac, 802.11n, 802.11g, 802.11b, and 802.11a.

The STA may be a wireless communications chip, a wireless sensor, or a wireless communications terminal, such as a mobile phone supporting a Wi-Fi communication function, a tablet computer supporting a Wi-Fi communication function, a set-top box supporting a Wi-Fi communication function, a smart television supporting a Wi-Fi communication function, a smart wearable device supporting a Wi-Fi communication function, an in-vehicle communications device supporting a Wi-Fi communication function, or a computer supporting a Wi-Fi communication function. Optionally, the STA may support the 802.11ax standard. Further, optionally, the STA may alternatively support a plurality of WLAN standards such as 802.11ac, 802.11n, 802.11g, 802.11b, and 802.11a.

On the WLAN, a quite large part of device power is consumed for idle listening (English: idle listening) performed when no signal is received. Currently, a related solution in a conventional 802.11 protocol (802.11b/a/g/n/ac or the like) focuses on optimization of a device sleep policy. When a device (such as a STA) does not receive or send data, if the device performs continuous channel listening, namely, idle listening, considerable power is consumed. Therefore, the STA may enter a sleep state when the STA does not receive or send data, to reduce power consumption caused due to continuous idle listening. However, when the STA is in the sleep state, an AP cannot communicate with the STA. The AP and the STA can perform data transmission only after the STA wakes up. This may cause a specific latency in data transmission. To avoid a high latency brought by a sleep mechanism, the STA usually follows a specific sleep policy to wake up from time to time to check whether there is data that needs to be received by the STA, but this reduces sleep efficiency of the STA (the STA wakes up from time to time, but there is no useful data that needs to be received and sent by the STA, and this case consumes more power compared with a case of relatively long sleep).

Except for optimization of the sleep policy, another technical approach to reducing power consumption caused due to idle listening by a device is to use a wake-up receiver. A core idea thereof is that a receive-end device (such as a STA) includes a wake-up receiver in addition to a conventional 802.11 main transceiver (referred to as a main transceiver below). After the main transceiver enters a sleep state, the wake-up receiver enters a working state. If another device (such as an AP) needs to communicate with the device (such as the STA) including the wake-up receiver and the main transceiver, the AP first sends a wake-up frame to the wake-up receiver of the STA; the wake-up receiver wakes up the main transceiver of the STA after correctly receiving the wake-up frame sent to the wake-up receiver, and enters a sleep state; and then the AP communicates with the awake main transceiver. After completing communication with the AP, the main transceiver enters the sleep state, and the wake-up receiver wakes up and starts to listen for whether there is a wake-up frame to be sent to the wake-up receiver, so as to wake up the main transceiver.

In this technology, a low-power consumption wake-up receiver instead of a main transceiver is used for channel listening when a medium is idle (herein, power consumption of the wake-up receiver in a listening/reception state is expected to be approximately 0.1% to 1% of power consumption of the main transceiver, that is, less than 100 milliwatts). This can effectively reduce power consumption caused due to idle listening by a device.

To achieve low power consumption, the wake-up receiver needs to be simpler and less complex in a circuit structure, a frame structure design (that is, a wake-up frame structure design), and the like. For example, the circuit structure of the wake-up receiver may include only an energy detection component and a radio frequency (RF) component, and therefore the wake-up receiver cannot perform demodulation specific to some complex modulation schemes. For this end, a binary amplitude shift keying (On-Off Keying, OOK) modulation scheme, a binary phase shift keying (BPSK) modulation scheme, or a frequency shift keying (FSK) modulation scheme that is simple to implement may be used for a wake-up frame.

This application briefly describes a networking mode of a WLAN below. As shown in FIG. 1, the WLAN may include an AP 101 and a plurality of STAs 102 associated with the AP 101, and the AP 101 may communicate with any one of the STAs 102 associated with the AP 101.

Figure 2A:
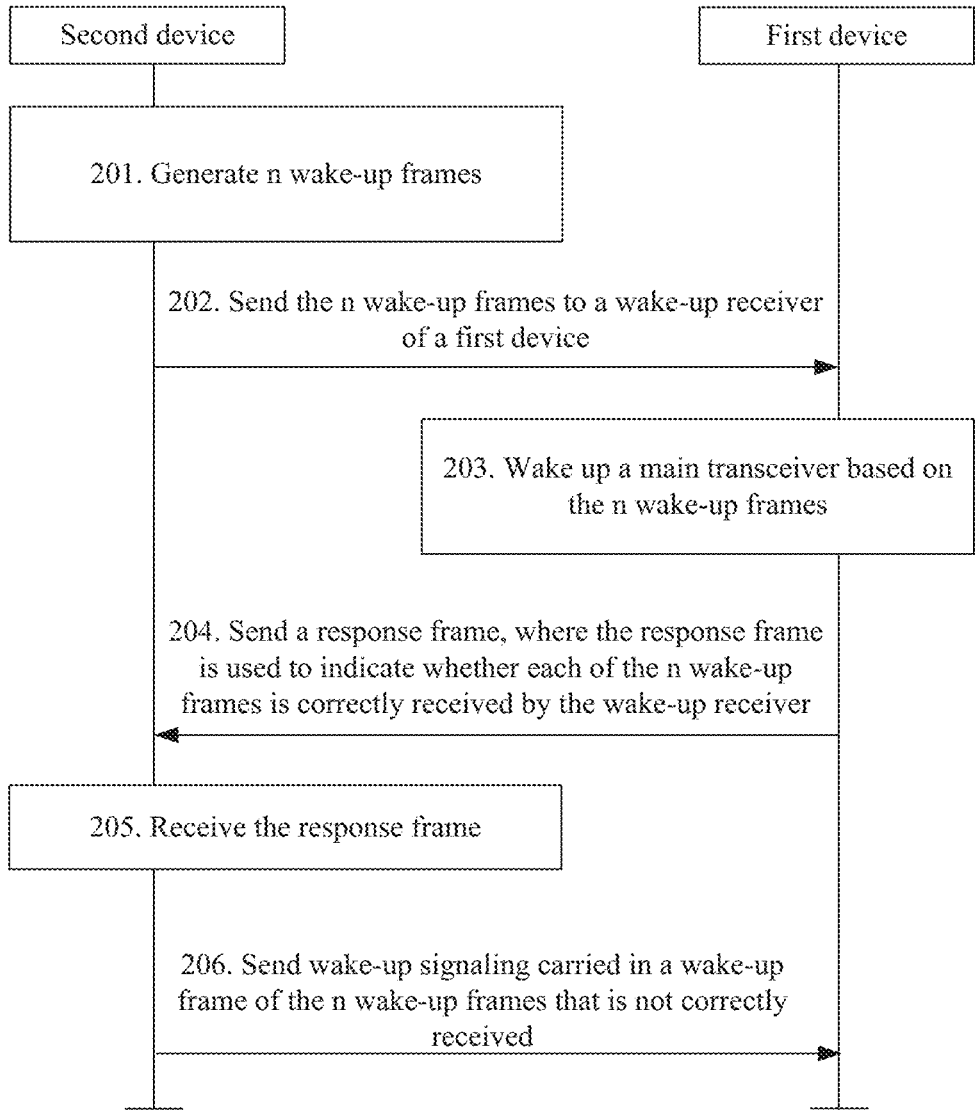
FIG. 2A is a flowchart of a frame transmission method according to an embodiment of the present disclosure.

FIG. 2A is a flowchart of a frame transmission method according to an example embodiment. As shown in FIG. 2A, the frame transmission method may be applied to a network architecture shown in FIG. 1. The method includes the following steps.

Step 201. A second device on a wireless local area network generates n wake-up frames, where each wake-up frame is used to instruct a wake-up receiver of a first device on the wireless local area network to wake up a main transceiver of the first device, and n is a positive integer greater than or equal to 1.

It should be noted that, the second device may be the AP 101 described above, and the first device may be the STA 102 described above. The second device may alternatively be the STA 102 described above, and correspondingly, the first device may be the AP 101 described above. In this embodiment of the present disclosure, only one example in which the second device is the AP 101 and the first device is the STA 102 is used for description. In actual application, a technical process of a case in which the second device is the STA 102 and the first device is the AP 101 is similar to a technical process of a case in which the second device is the AP 101 and the first device is the STA 102. Details are not repeated herein in this application.

As described above, the main transceiver of the first device may enter a sleep state when the main transceiver does not send and receive data, and the main transceiver in the sleep state cannot communicate with another device. In this case, if the second device needs to communicate with the first device, the second device needs to first wake up the main transceiver of the first device by using the wake-up receiver of the first device. For this end, according to a related technology, the second device may generate a wake-up frame. The wake-up frame is used to instruct the wake-up receiver of the first device to wake up the main transceiver of the first device. However, wake-up signaling in the wake-up frame includes much content, and therefore the wake-up frame has a relatively long length. This causes that the wake-up receiver of the first device easily fails to correctly receive the wake-up frame. As a result, the wake-up frame has relatively weak robustness.

To resolve the foregoing problem, the second device in this application may segment the content included in the wake-up signaling in the wake-up frame, and generate n wake-up frames to carry the segmented content. Each of the n wake-up frames may be used to instruct the wake-up receiver of the first device to wake up the main transceiver of the first device. The content of the wake-up signaling in the wake-up frame is segmented. In this way, first, lengths of all the n wake-up frames are relatively short, so that the wake-up receiver is easier to correctly receive the n wake-up frames. Second, when there is a wake-up frame of the n wake-up frames that is not correctly received by the wake-up receiver, the wake-up receiver can still wake up the main transceiver based on a correctly received wake-up frame, so as to ensure that the main transceiver can be woken up in time, thereby reducing a data transmission latency. Third, when there is a wake-up frame of the n wake-up frames that is not correctly received by the wake-up receiver, the second device may send only wake-up signaling included in the wake-up frame that is not correctly received, thereby reducing network bandwidth. This improves wake-up frame robustness.

Alternatively, the second device may generate n wake-up frames, and continuously send the n wake-up frames to the first device. The n wake-up frames may carry different content of wake-up signaling, to instruct the wake-up receiver of the first device to wake up, at different moments, the main transceiver of the first device.

It should be noted that, as described above, the wake-up receiver can recognize only some data frames whose modulation schemes are relatively simple, such as a data frame modulated by using an OOK modulation scheme, a data frame modulated by using a BPSK modulation scheme, and a data frame modulated by using an FSK modulation scheme, but cannot recognize a data frame modulated by using a modulation scheme specified by a wireless local area network standard. Therefore, frame structures of the n wake-up frames are substantially different from a frame structure of a data frame transmitted by a main transceiver of a device on the wireless local area network. This application provides two wake-up-frame frame structures below. It should be noted that, the following description of the wake-up-frame frame structure is merely an example and cannot limit this application.

Figure 2B:
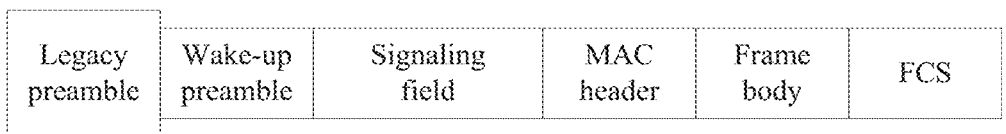
FIG. 2B is a schematic diagram of a wake-up-frame frame structure according to an embodiment of the present disclosure.

First wake-up-frame frame structure: As shown in FIG. 2B, a wake-up frame includes a legacy preamble, a wake-up preamble, a signaling field, a Media Access Control (MAC) header, a frame body, and a frame check sequence (FCS). The signaling field includes a wake-up identifier and a cyclic redundancy check (CRC) of the signaling field, and the wake-up identifier is used to identify the first device. The MAC header includes a frame type identifier and a receiver MAC address.

The legacy preamble may include a short training field, a long training field, and a signaling field. The legacy preamble may be a preamble of a data frame specified by a conventional wireless local area network standard (such as the 802.11 protocol, the 802.16 protocol, or the 802.15 protocol), and therefore can be recognized by a main transceiver of a device on the wireless local area network. After generating the n wake-up frames, the second device may broadcast the n wake-up frames to a plurality of devices associated with the second device. After receiving any one of the n wake-up frames, a main transceiver, in a working state, of the plurality of devices may recognize the legacy preamble, so as to determine that a channel is currently occupied by a device. Therefore, the main transceiver that recognizes the legacy preamble does not preempt the channel in a time period, so as to ensure normal wake-up frame transmission.

Modulation schemes of the wake-up preamble, the signaling field, the MAC header, the frame body, and the FCS are modulation schemes that can be recognized by the wake-up receiver, for example, an OOK modulation scheme, a BPSK modulation scheme, or an FSK modulation scheme. The wake-up preamble, the signaling field, the MAC header, the frame body, and the FCS may be transmitted on narrow bandwidth, for example, 1 M, 2 M, and 8 M, or certainly, may be transmitted on transmission bandwidth specified by a wireless local area network standard for a data frame, for example, bandwidth of 20 M specified by the 802.11 protocol. No specific limitation is set thereto either in this application.

The wake-up preamble is mainly used by the wake-up receiver to synchronize a field following the wake-up preamble. For example, the wake-up receiver may determine that five bits following the wake-up preamble are a signaling field.

The signaling field may include the wake-up identifier, an AP identifier, and the CRC of the signaling field. The wake-up identifier may be an association identifier (AID) allocated by an AP to the main transceiver of the first device in networking, or an identifier allocated by an AP to the wake-up receiver of the first device. The wake-up identifier may alternatively be some bits of an association identifier or an identifier allocated to the wake-up receiver, and may be used to identify the first device. The AP identifier is an identifier of an AP associated with the first device. Certainly, the AP identifier may alternatively be an identifier of a basic service set (BSS) including the AP associated with the first device. No specific limitation is set thereto in this application. The CRC is used by the first device to check correctness and integrity of data in the signaling field in the wake-up frame. Specifically, when generating the wake-up frame, the second device may calculate, by using an algorithm (which is usually a polynomial algorithm), the data in the signaling field to obtain a CRC. After receiving the wake-up frame, the first device may calculate the data in the signaling field based on the same algorithm. If a calculation result is the same as the foregoing CRC, it indicates that the data in the signaling field in the received wake-up frame is correct and integrate. Otherwise, it indicates that the data in the signaling field of the received wake-up frame is incorrect or incomplete. In an embodiment of the present disclosure, the signaling field may further include modulation and coding indication information of the wake-up frame. No specific limitation is set thereto either in this application.

The MAC header includes the frame type identifier and the receiver MAC address. The receiver MAC address is a MAC address of the first device or a part of a MAC address of the first device. The frame type identifier in the wake-up frame may indicate that the wake-up frame is a data frame instructing the wake-up receiver to wake up the main transceiver. In an embodiment of the present disclosure, the MAC header may further include a transmitter MAC address: a MAC address of the second device or a part of a MAC address of the second device. No specific limitation is set thereto in this application.

The frame body may include wake-up signaling, and the wake-up signaling may include a timestamp, wake-up time, a wake-up cycle, a main-transceiver receive working mode (such as a quantity of received streams and receive bandwidth), a channel number, and the like. No specific limitation is set thereto in this application. The wake-up time is used to indicate a moment of waking up the main transceiver to the wake-up receiver. The wake-up cycle is used to instruct the wake-up receiver to wake up the main transceiver at intervals of predetermined time. The main-transceiver receive working mode, the channel number, and the like are used to indicate parameters for data reception or transmitting after the main transceiver is woken up.

The FCS is used by the first device to check correctness and integrity of data in the wake-up frame. A check principle of the FCS is similar to a check principle of the CRC used for the signaling field. Details are not repeated herein in this application.

Figure 2C:
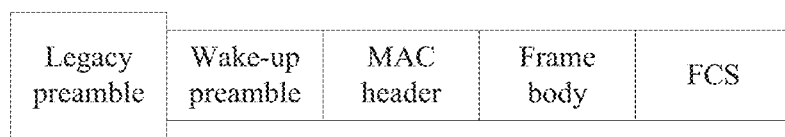
FIG. 2C is a schematic diagram of a wake-up-frame frame structure according to an embodiment of the present disclosure.

Second frame structure of wake-up frame: As shown in FIG. 2C, a wake-up frame includes a legacy preamble, a wake-up preamble, a MAC header, a frame body, and an FCS, and the MAC header includes a frame type identifier, a receiver MAC address, and a CRC of the MAC header.

Included content and functions of the legacy preamble, the wake-up preamble, the frame body, and the FCS of the second frame structure are similar to the included content and the functions of the legacy preamble, the wake-up preamble, the frame body, and the FCS of the first wake-up frame. Details are not repeated herein in this application. It should be noted that, in the second frame structure of wake-up frame, the MAC header includes the CRC. The CRC is used by the first device to check correctness and integrity of data in the MAC header in the wake-up frame. A check principle of the CRC is similar to the check principle of the CRC, used for the signaling field, of the first frame structure of wake-up frame. Details are not repeated herein in this application. In another implementation of the present disclosure, the MAC header may not include the CRC. In this case, the first device cannot independently check correctness and integrity of the data in the MAC header. In addition, in an embodiment of the present disclosure, the MAC header further includes a transmitter MAC address: a MAC address of the second device or a part of a MAC address of the second device. No specific limitation is set thereto in this application.

In addition, for the foregoing two wake-up-frame frame structures, the wake-up frame may further include a segment number, and the segment number is used to indicate an order of the wake-up frame among the n wake-up frames. The segment number may be located in the MAC header in the wake-up frame, or may be located in the signaling field in the wake-up frame. No specific limitation is set thereto in this application. In actual application, a maximum value of n may be specified on the wireless local area network. For example, the maximum value of n may be specified as 2, 4, or 8. In some cases, a segment number of a wake-up frame may not only indicate an order of the wake-up frame among the n wake-up frames, but also enable the wake-up receiver to determine a quantity of wake-up frames that need to be received subsequently. In actual application, the second device may send the n wake-up frames in a descending order of segment numbers. For example, the maximum value of n is specified as 4 on the wireless local area network and the second device generates four wake-up frames, and the second device sends the four wake-up frames in an order: a segment number 011, a segment number 010, a segment number 001, and a segment number 000. When receiving a wake-up frame whose segment number is 001, the first device may determine that one wake-up frame further needs to be received subsequently. Certainly, the second device may alternatively send the n wake-up frames in an ascending order of segment numbers. For example, the maximum value of n is specified as 4 on the wireless local area network and the second device generates four wake-up frames, and the second device sends the four wake-up frames in an order: a segment number 000, a segment number 001, a segment number 010, and a segment number 011. When receiving a wake-up frame whose segment number is 001, the first device may determine that the wake-up frame comes second among the n (4) wake-up frames.

Further, for the foregoing two wake-up-frame frame structures, the wake-up frame may further include a segment indication identifier, and the segment indication identifier is used to indicate whether n is equal to 1, that is, whether there are a plurality of (more than one) wake-up frames. Similarly, the segment indication identifier may be located in the MAC header in the wake-up frame, or may be located in the signaling field in the wake-up frame. No specific limitation is set thereto in this application. It should be noted that, when n is equal to 1, the wake-up frame may not include the segment number. No specific limitation is set thereto in this application.

Step 202. The second device sends the n wake-up frames to the wake-up receiver of the first device.

Step 203. The first device wakes up the main transceiver based on the n wake-up frames.

In actual application, the first device may wake up the main transceiver after the wake-up receiver of the first device correctly receives any one of the n wake-up frames. In other words, the wake-up receiver may wake up the main transceiver upon correctly receiving a wake-up frame of the n wake-up frames. Certainly, the wake-up receiver may alternatively wake up the main transceiver after correctly receiving the last one of the n wake-up frames. When the second device sends the n wake-up frames in the descending order of the segment numbers, the last wake-up frame is a wake-up frame with a minimum segment number, for example, the segment number 000 described above.

Step 204. The first device sends a response frame to the second device, where the response frame is used to indicate whether each of the n wake-up frames is correctly received by the wake-up receiver.

In actual application, the first device needs to feed back, to the second device by using a response frame, whether each of the n wake-up frames is correctly received, so that the second device sends, to the first device, wake-up signaling carried in a wake-up frame of the n wake-up frames that is not correctly received.

It should be noted that, in actual application, the first device may determine, by checking an FCS of a wake-up frame, whether the wake-up frame is correctly received. If FCS check of the wake-up frame succeeds, it indicates that the wake-up frame is correctly received, and if FCS check of the wake-up frame fails, it indicates that the wake-up frame is not correctly received.

In actual application, the response frame may have a plurality of forms. This application provides four response frame forms below. It should be noted that, the following description of the response frame forms is merely an example and cannot limit this application.

Figure 2D:
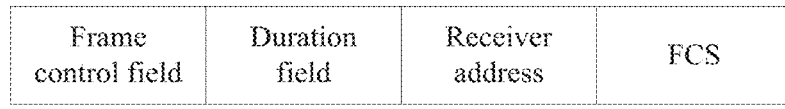
FIG. 2D is a schematic diagram of a frame structure of an ACK frame according to an embodiment of the present disclosure.

Type 1: The response frame may be an acknowledgment (ACK) frame. The ACK frame is a data frame defined by a wireless local area network standard (such as the 802.11 protocol). On the wireless local area network, a main transceiver (after being woken up) of a receive end may send the ACK frame to a transmit end to feed back whether the data frame sent by the transmit end is correctly received. As shown in FIG. 2D, according to specifications of the wireless local area network standard (such as the 802.11 protocol), the ACK frame may include a frame control field, a duration field, a receiver address, and an FCS. In this application, the ACK frame may be used as the response frame described above in this application. In this application, several bits of the duration field may be used to form a segment bitmap. The segment bitmap is used to indicate whether each of the n wake-up frames is correctly received by the wake-up receiver. For example, if a wireless local area network protocol specifies that the maximum value of n is 8, the second device sends a total of four wake-up frames to the first device, numbers of a first segment to a fourth segment are 011, 010, 001, and 000, respectively, and the first device correctly receives wake-up frames whose segment numbers are 011 and 010, but does not correctly receive wake-up frames whose segment numbers are 001 and 000, the segment bitmap may include eight bits that may be specifically "00000011", where 1 indicates that a wake-up frame is correctly received and 0 indicates that a wake-up frame is not correctly received. It should be noted that, meanings of "0" and "1" are merely examples and cannot limit this application. In this application, the frame control field may include a frame type identifier, and the frame type identifier is used to indicate that the ACK frame is the response frame. A length of the frame type identifier may be a value of a field including one bit or a plurality of bits.

Figure 2E:
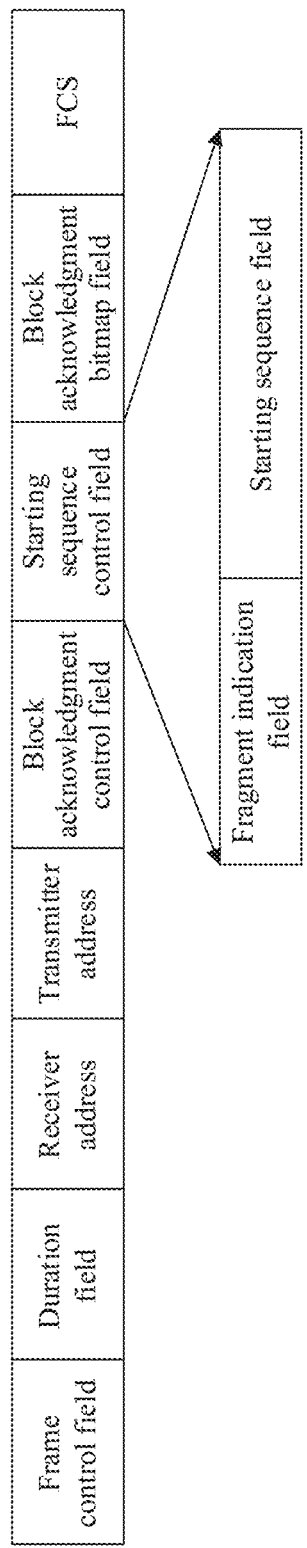
FIG. 2E is a schematic diagram of a frame structure of a block ACK frame according to an embodiment of the present disclosure.

Type 2: The response frame may be a block acknowledgment (Block ACK) frame. The block ACK frame is a data frame defined by a wireless local area network standard (such as the 802.11 protocol). On the wireless local area network, a main transceiver (after being woken up) of a receive end may send the block ACK frame to a transmit end to feed back whether a plurality of data frames sent by the transmit end are correctly received. As shown in FIG. 2E, according to specifications of the wireless local area network standard (such as the 802.11 protocol), the block ACK frame may include a frame control field, a duration field, a receiver address, a transmitter address, a block acknowledgment control field, a starting sequence control field, a block acknowledgment bitmap field, and an FCS. The starting sequence control field includes a fragment indication field and a starting sequence field. In this application, the block ACK frame may be used as the response frame described above in this application. In this application, several bits of the starting sequence field or the block acknowledgment bitmap field may be used to form a segment bitmap. In this application, a reserved bit in the fragment indication field or the block acknowledgment control field may be used to indicate a frame type. A length of a frame type identifier may be a value of a field including one bit or a plurality of bits (a length of a fragment indication field of a block ACK frame in existing 802.11ax is four bits, one of which is an unused reserved bit).

Figure 2F:
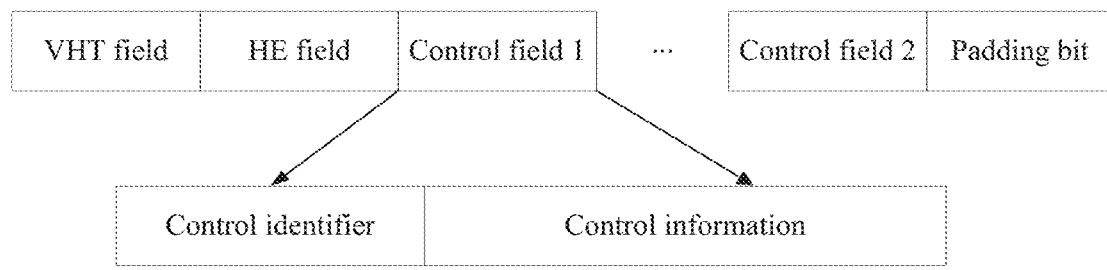
FIG. 2F is a schematic diagram of a frame structure of an HT-control field according to an embodiment of the present disclosure.

Type 3: The response frame may be a data frame including a high throughput control (HT-control) field. The HT-control field is a field defined by a wireless local area network standard (such as the 802.11 protocol), and is used to carry a control command in a data frame or carry a link self-adaptation parameter. As shown in FIG. 2F, according to specifications of the wireless local area network standard (such as the 802.11 protocol), the HT-control field includes a very high throughput (VHT) field, a high efficiency (HE) field, and a plurality of control fields. Each of the plurality of control fields includes a control identifier and corresponding control information. In some cases, the HT-control field may further include a padding bit. When the VHT field is set to 1, it indicates that the HT-control field is an HT-control variant field carried in a data frame specified by 802.11ac. When the HE field is set to 1, it indicates that the HT-control field is an HT-control variant field carried in a data frame specified by 802.11ax. When the VHT field is set to 0 and the HE field is set to 0, it indicates that the HT-control field is an HT-control variant field carried in a data frame specified by 802.11n. Usually, the control field may carry some control information and a corresponding control identifier. For example, a control identifier "0000" indicates that the control field carries scheduling information specific to uplink acknowledgment frames from a plurality of stations, and control information corresponding to the control identifier is specific resource scheduling information for the uplink acknowledgment frames from the plurality of stations; a control identifier "0001" indicates that the control field carries an operation mode indication, and control information corresponding to the control identifier is a quantity of received streams, receive bandwidth, a quantity of transmit streams, transmit power, and the like that are corresponding to a receive operation mode. In this application, the data frame including the HT-control field may be used as the response frame described above in this application, and is sent by a transceiver (after being woken up) of a receive end to a transmit end. A control identifier may be defined in this application, and the control identifier indicates whether n wake-up frames are correctly received, and is the frame type identifier described above. Control information corresponding to the control identifier may include the foregoing segment bitmap.

Figure 2G:
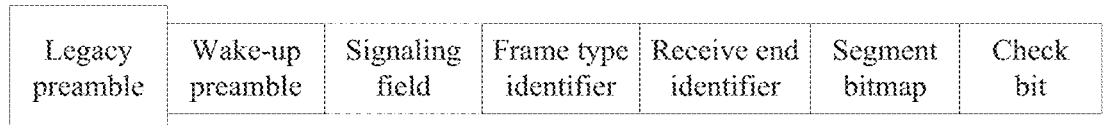
FIG. 2G is a schematic diagram of a frame structure of a wake-up acknowledgment frame according to an embodiment of the present disclosure.

Type 4: The response frame may be a wake-up acknowledgment frame. A frame structure of the wake-up acknowledgment frame is similar to the structure of the wake-up frame described above, and the wake-up acknowledgment frame is sent by a wake-up receiver of a receive end to a transmit end. Specifically, as shown in FIG. 2G, the wake-up acknowledgment frame includes a legacy preamble, a wake-up preamble, a frame type identifier, a receive end identifier, a segment bitmap, and a check bit. In some embodiments of this application, the wake-up acknowledgment frame may further include a signaling field. No specific limitation is set thereto in this application. Included content and functions of the legacy preamble, the wake-up preamble, the receive end identifier, the frame type identifier, and the segment bitmap are similar to those described above. Details are not repeated herein in this application. It should be noted that, the check bit may be any check code for checking data correctness and integrity. In an embodiment of this application, the check bit may be an FCS.

An ACK frame, a block ACK frame, and a data frame including an HT-control field that are defined by wireless local area network standards are used in this application. In this way, the response frame in this application can be adaptable to an existing wireless local area network standard, and commonality of the response frame is ensured.

It should be noted that, first three types of the response frames provided in this application are all data frames defined by wireless local area network standards, and can be generated only by the main transceiver of the first device and can be recognized only by a main transceiver of the second device. When a wake-up receiver has a transmit function, this application may alternatively provide the type-4 response frame. A frame structure of the type-4 response frame is similar to a frame structure of the wake-up-frame, and the type-4 response frame may be generated by the wake-up receiver of the first device and may be recognized by a wake-up receiver of the second device.

Step 205. The second device receives the response frame sent by the first device.

Step 206. The second device sends, to the first device based on the response frame, wake-up signaling carried in a wake-up frame of the n wake-up frames that is not correctly received.

It should be noted that, in step 206, there may be two methods to implement the technical process of sending, by the second device to the first device, wake-up signaling carried in a wake-up frame of the n wake-up frames that is not correctly received. In a first method, a main transceiver of the second device sends, to the main transceiver of the first device by using a data frame specified by a wireless local area network standard, the wake-up signaling carried in the wake-up frame of the n wake-up frames that is not correctly received. In a second method, a wake-up receiver of the second device may re-send, to the wake-up receiver of the first device, the wake-up frame of the n wake-up frames that is not correctly received. No specific limitation is set thereto in this application.

In conclusion, according to the frame transmission method provided in this embodiment of the present disclosure, the second device sends the n wake-up frames to the first device, and the n wake-up frames each carry segmented content of wake-up signaling, so that the wake-up receiver of the first device wakes up the main transceiver of the first device based on the n wake-up frames, and the main transceiver sends the response frame to the second device after being woken up. The n wake-up frames each carry the segmented content of the wake-up signaling. In this way, first, lengths of all the n wake-up frames are relatively short, so that the wake-up receiver is easier to correctly receive the n wake-up frames. Second, when there is a wake-up frame of the n wake-up frames that is not correctly received by the wake-up receiver, the wake-up receiver can still wake up the main transceiver based on a correctly received wake-up frame, so as to ensure that the main transceiver can be woken up in time, thereby reducing a data transmission latency. Third, when there is a wake-up frame of the n wake-up frames that is not correctly received by the wake-up receiver, the second device may send only wake-up signaling included in the wake-up frame that is not correctly received, thereby reducing network bandwidth. This improves wake-up frame robustness.

Figure 3:
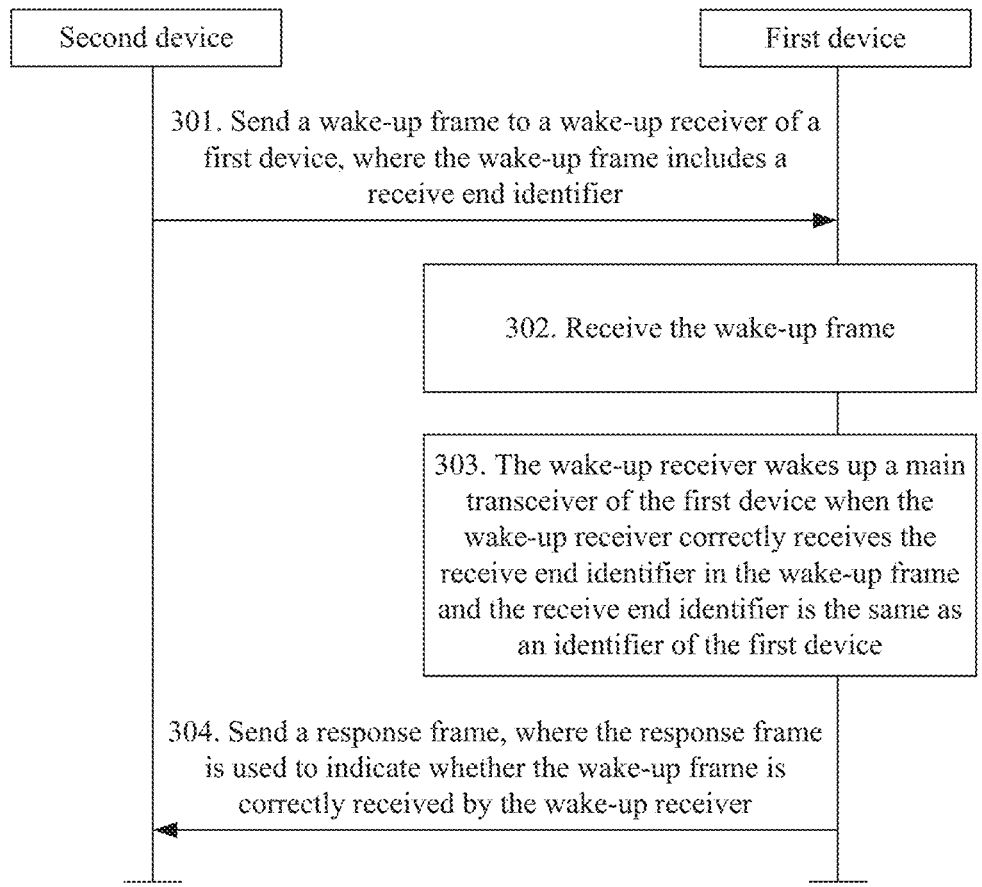
FIG. 3 is a flowchart of a frame transmission method according to an embodiment of the present disclosure.

FIG. 3 is a flowchart of a frame transmission method according to an example embodiment. As shown in FIG. 3, the frame transmission method may be applied to a network architecture shown in FIG. 1. The method includes the following steps.

Step 301. A second device sends a wake-up frame to a wake-up receiver of a first device, where the wake-up frame includes a receive end identifier.

In this embodiment, there may be still two types of frame structures for the wake-up-frame. The two types of frame structures are similar to the frame structures shown in FIG. 2B and FIG. 2C. Details are not repeated herein in this embodiment.

It should be noted that, the receive end identifier may be a wake-up identifier, an AP identifier, or a receiver MAC address.

Step 302. The wake-up receiver of the first device receives the wake-up frame sent by the second device.

Step 303. The wake-up receiver of the first device wakes up a main transceiver of the first device when the wake-up receiver correctly receives the receive end identifier in the wake-up frame and the receive end identifier is the same as an identifier of the first device.

In actual application, a transmission mode on a wireless local area network is a broadcast mode. Therefore, the wake-up frame received by the wake-up receiver of the first device may not necessarily be a wake-up frame sent to the wake-up receiver. If the wake-up frame received by the wake-up receiver is a wake-up frame sent to the wake-up receiver, the wake-up receiver determines that there is another device that needs to communicate with the first device. In this case, the wake-up receiver may wake up the main transceiver of the first device. If the wake-up frame received by the wake-up receiver is not a wake-up frame sent to the wake-up receiver, the wake-up receiver may discard the wake-up frame.

In this embodiment of the present disclosure, the first device may determine, based on the following method, whether the received wake-up frame is a wake-up frame sent to the first device: determining, by the first device, whether the receive end identifier in the wake-up frame received by the wake-up receiver is correctly received; if the first device determines that the receive end identifier is correctly received, determining, by the first device, whether the receive end identifier is the same as the identifier of the first device; and if the receive end identifier in the wake-up frame received by the wake-up receiver is correctly received, and the correctly received receive end identifier is the same as the identifier of the first device, determining, by the first device, that the wake-up frame received by the wake-up receiver is a wake-up frame sent to the first device.

For the frame structure shown in FIG. 2B, a signaling field includes a wake-up identifier. Therefore, if a signaling field in the wake-up frame is correctly received, the first device may determine that the receive end identifier in the wake-up frame is correctly received. Specifically, the first device may check a CRC in the signaling field to determine whether the signaling field is correctly received. After determining that the signaling field is correctly received, the first device may determine whether the wake-up identifier in the signaling field is the same as a wake-up identifier of the first device. In addition, a wake-up identifier is unique only within an area managed by an AP, and therefore the first device further needs to determine whether an AP identifier in the signaling field is the same as an identifier of an AP associated with the first device. If CRC check of the signaling field in the wake-up frame succeeds, the wake-up identifier in the wake-up frame is the same as the wake-up identifier of the first device, and the AP identifier in the wake-up frame is the same as the identifier of the AP associated with the first device, the wake-up receiver of the first device may wake up the main transceiver of the first device.

For the frame structure shown in FIG. 2C, a MAC header includes a receiver MAC address. Therefore, if a MAC header in the wake-up frame is correctly received, the first device may determine that the receive end identifier in the wake-up frame is correctly received. Specifically, the first device may check a CRC in the MAC header to determine whether the MAC header is correctly received. After determining that the MAC header is correctly received, the first device may determine whether a receiver MAC address in the MAC header is the same as a MAC address of the first device. If CRC check of the MAC header in the wake-up frame succeeds and the receiver MAC address in the wake-up frame is the same as the MAC address of the first device, the wake-up receiver of the first device wakes up the main transceiver of the first device.

In this application, the first device may wake up the main transceiver provided that the first device determines that the receive end identifier in the wake-up frame is correctly received by the wake-up receiver and that the receive end identifier is the same as the identifier of the first device, without considering whether another part of the wake-up frame is correctly received. In this way, even if the other part of the wake-up frame is not correctly received, the main transceiver can still be woken up in time, thereby reducing a data transmission latency.

Step 304. After the main transceiver is woken up, the first device sends a response frame to the second device, where the response frame is used to indicate whether the wake-up frame is correctly received by the wake-up receiver.

In this embodiment of this application, the response frame may be any one of the response frames provided in FIG. 2D, FIG. 2E, FIG. 2F, and FIG. 2G. In other words, the response frame may be an ACK frame, a block ACK frame, a data frame including an HT-control field, or a wake-up acknowledgment frame.

In conclusion, according to the frame transmission method provided in this embodiment, the first device wakes up the main transceiver after determining that the receive end identifier in the wake-up frame is correctly received by the wake-up receiver and that the receive end identifier is the same as the identifier of the first device. Therefore, the wake-up receiver of the first device wakes up the main transceiver, without considering whether another part of the wake-up frame is correctly received. In this way, even if the other part of the wake-up frame is not correctly received, the main transceiver can still be woken up in time, thereby reducing a data transmission latency.

Figure 4:
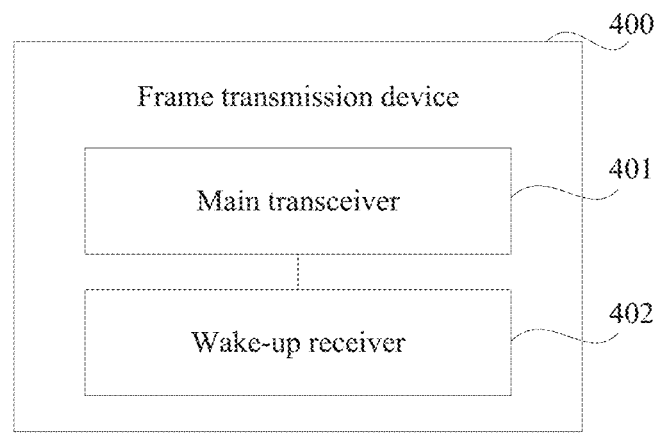
FIG. 4 is a block diagram of a frame transmission device 400 according to an embodiment of the present disclosure.

FIG. 4 is a block diagram of a frame transmission device 400 according to an example embodiment. The frame transmission device 400 may include a main transceiver 401 and a wake-up receiver 402.

The main transceiver 401 is configured to perform the operation performed by the main transceiver of the first device in the embodiment shown in FIG. 2A, or is configured to perform the operation performed by the main transceiver of the first device in the embodiment shown in FIG. 3.

The wake-up receiver 402 is configured to perform the operation performed by the wake-up receiver of the first device in the embodiment shown in FIG. 2A, or is configured to perform the operation performed by the wake-up receiver of the first device in the embodiment shown in FIG. 3.

In conclusion, according to the frame transmission device provided in this embodiment, the wake-up receiver of the frame transmission device receives n wake-up frames, and the n wake-up frames each carry segmented content of wake-up signaling, so that the wake-up receiver wakes up the main transceiver of the frame transmission device based on the n wake-up frames. The n wake-up frames each carry the segmented content of the wake-up signaling. In this way, first, lengths of all the n wake-up frames are relatively short, so that the wake-up receiver is easier to correctly receive the n wake-up frames. Second, when there is a wake-up frame of the n wake-up frames that is not correctly received by the wake-up receiver, the wake-up receiver can still wake up the main transceiver based on a correctly received wake-up frame, so as to ensure that the main transceiver can be woken up in time, thereby reducing a data transmission latency. Third, when there is a wake-up frame of the n wake-up frames that is not correctly received by the wake-up receiver, a transmit end may send only wake-up signaling included in the wake-up frame that is not correctly received, thereby reducing network bandwidth. This improves wake-up frame robustness.

Further, after a receive end identifier in the wake-up frame is correctly received by the wake-up receiver and the receive end identifier is the same as an identifier of the frame transmission device, the wake-up receiver wakes up the main transceiver. Therefore, when the wake-up receiver wakes up the main transceiver, there is no need to consider whether another part of the wake-up frame is correctly received. In this way, even if the other part of the wake-up frame is not correctly received, the main transceiver can still be woken up in time, thereby reducing a data transmission latency.

Figure 5:
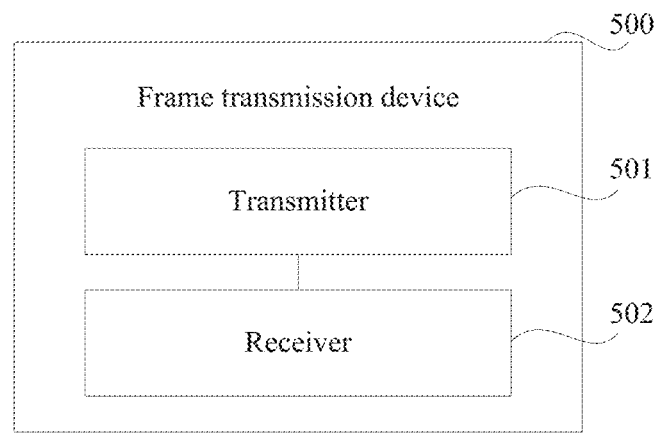
FIG. 5 is a block diagram of a frame transmission device 500 according to an embodiment of the present disclosure.

FIG. 5 is a block diagram of a frame transmission device 500 according to an example embodiment. The frame transmission device 500 may include a transmitter 501 and a receiver 502.

The transmitter 501 is configured to perform step 202.

The receiver 502 is configured to perform step 205.

In conclusion, according to the frame transmission device provided in this embodiment, n wake-up frames are sent to a first device, and the n wake-up frames each carry segmented content of wake-up signaling, so that a wake-up receiver of the first device wakes up a main transceiver of the first device based on the n wake-up frames. The n wake-up frames each carry the segmented content of the wake-up signaling. In this way, first, lengths of all the n wake-up frames are relatively short, so that the wake-up receiver is easier to correctly receive the n wake-up frames. Second, when there is a wake-up frame of the n wake-up frames that is not correctly received by the wake-up receiver, the wake-up receiver can still wake up the main transceiver based on a correctly received wake-up frame, so as to ensure that the main transceiver can be woken up in time, thereby reducing a data transmission latency. Third, when there is a wake-up frame of the n wake-up frames that is not correctly received by the wake-up receiver, a second device may send only wake-up signaling included in the wake-up frame that is not correctly received, thereby reducing network bandwidth. This improves wake-up frame robustness.

In addition, the frame transmission devices provided in the embodiments shown in FIG. 4 and FIG. 5 are based on a same idea as the embodiments of the frame transmission methods. For specific implementation processes of the frame transmission devices, refer to the method embodiments. Details are not repeated herein.

Figure 6:
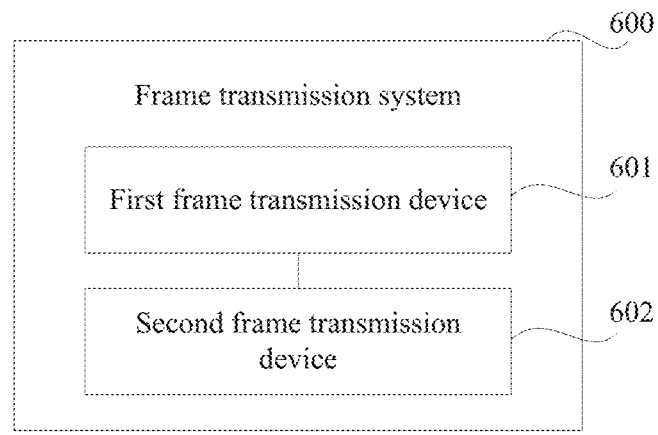
FIG. 6 is a block diagram of a frame transmission system 600 according to an embodiment of the present disclosure.

FIG. 6 is a schematic diagram of a frame transmission system 600 according to an example embodiment. The frame transmission system includes a first frame transmission device 601 and a second frame transmission device 602.

The first frame transmission device 601 is configured to perform the operation performed by the first device in the embodiment of FIG. 2A.

The second frame transmission device 602 is configured to perform the operation performed by the second device in the embodiment of FIG. 2A.

In conclusion, according to the frame transmission system provided in this embodiment, the second frame transmission device sends n wake-up frames to the first frame transmission device, and the n wake-up frames each carry segmented content of wake-up signaling, so that a wake-up receiver of the first device wakes up a main transceiver of the first device based on the n wake-up frames. The n wake-up frames each carry the segmented content of the wake-up signaling. In this case, first, lengths of the n wake-up frames are all relatively short, so that the wake-up receiver is easier to correctly receive the n wake-up frames. Second, when there is a wake-up frame of the n wake-up frames that is not correctly received by the wake-up receiver, the wake-up receiver can still wake up the main transceiver based on a correctly received wake-up frame, so as to ensure that the main transceiver can be woken up in time, thereby reducing a data transmission latency. Third, when there is a wake-up frame of the n wake-up frames that is not correctly received by the wake-up receiver, the second device may send only wake-up signaling included in the wake-up frame that is not correctly received, thereby reducing network bandwidth. This improves wake-up frame robustness.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing description is merely optional embodiments of this application, but is not intended to limit this application. Any modification, equivalent replacement, or improvement made without departing from the spirit and principle of this application should fall within the protection scope of this application.

What is claimed is:

1. A frame transmission method applied to a first device on a wireless local area network, wherein the first device comprises a main transceiver and a wake-up receiver, the method comprising:
   receiving, by the wake-up receiver, n wake-up frames from a second device on the wireless local area network, wherein a wake-up frame of the n wake-up frames is used to instruct the wake-up receiver to wake up the main transceiver, and n is a positive integer greater than or equal to 1; and
   sending, by the main transceiver, a response frame to the second device after being woken up, the response frame indicating whether each of the n wake-up frames is correctly received by the wake-up receiver;
   wherein the response frame is a block acknowledgment frame comprising a frame control field, a duration field, a receiver address, a transmitter address, a block acknowledgment control field, a starting sequence control field, a block acknowledgment bitmap field, and a frame check sequence (FCS);
   the starting sequence control field comprises a fragment indication field and a starting sequence field;
   the starting sequence field or the block acknowledgment bitmap field comprises a segment bitmap for indicating whether each of the n wake-up frames is correctly received by the wake-up receiver; and
   the fragment indication field or the block acknowledgment control field comprises a frame type identifier for indicating that the block acknowledgment frame is the response frame; or
   wherein the response frame is a data frame comprising a high throughput (HT) control field, wherein the HT control field comprises a very high throughput (VHT) field, a high efficiency (HE) field, and a plurality of control fields, and each of the plurality of control fields comprises a control identifier and corresponding control information; and
   the control information comprises the segment bitmap for indicating whether each of the n wake-up frames is correctly received by the wake-up receiver, or
   the control identifier comprises a frame type identifier for indicating that the data frame is the response frame.

2. The method according to claim 1, wherein each wake-up frame comprises a segment number to indicate an order of the wake-up frame among the n wake-up frames.

3. The method according to claim 1, wherein each wake-up frame comprises a segment indication identifier to indicate whether n is equal to 1.

4. The method according to claim 1, wherein before sending, by the main transceiver, the response frame to the second device after being woken up, the method further comprises:
waking up, by the wake-up receiver, the main transceiver after correctly receiving any one of the n wake-up frames; or
waking up, by the wake-up receiver, the main transceiver after correctly receiving a last one of the n wake-up frames.

5. A frame transmission method applied to a second device on a wireless local area network, the method comprising:
sending n wake-up frames to a wake-up receiver of a first device on the wireless local area network, a wake-up frame of the n wake-up frames instructs the wake-up receiver to wake up a main transceiver of the first device, and wherein n is a positive integer greater than or equal to 1; and
receiving a response frame sent by the first device, wherein the response frame indicates whether each of the n wake-up frames is correctly received by the wake-up receiver,
wherein the response frame is a block acknowledgment frame comprising a frame control field, a duration field, a receiver address, a transmitter address, a block acknowledgment control field, a starting sequence control field, a block acknowledgment bitmap field, and a frame check sequence (FCS);
the starting sequence control field comprises a fragment indication field and a starting sequence field; and
the starting sequence field or the block acknowledgment bitmap field comprises a segment bitmap to indicate whether each of the n wake-up frames is correctly received by the wake-up receiver; and
the fragment indication field or the block acknowledgment control field comprises a frame type identifier to indicate that the block acknowledgment frame is the response frame; or
wherein the response frame is a data frame comprising a high throughput (HT) control field, wherein the HT control field comprises a very high throughput (VHT) field, a high efficiency (HE) field, and a plurality of control fields, and each of the plurality of control fields comprises a control identifier and corresponding control information;
the control information comprises the segment bitmap for indicating whether each of the n wake-up frames is correctly received by the wake-up receiver; and
the control identifier comprises a frame type identifier for indicating that the data frame is the response frame.

6. The method according to claim 5, wherein each wake-up frame comprises a segment number for indicating an order of the wake-up frame among the n wake-up frames.

7. The method according to claim 5, wherein each wake-up frame comprises a segment indication identifier for indicating whether n is equal to 1.

8. The method according to claim 5, wherein after receiving the response frame sent by the first device, the method further comprises:
sending, to the first device based on the response frame, wake-up signaling carried in a wake-up frame of the n wake-up frames that is not correctly received.

9. A frame transmission device for use in a wireless local area network, the frame transmission device comprising
a wake-up receiver configured to receive n wake-up frames from a second device on the wireless local area network, wherein a wake-up frame of the n wake-up frames is used to instruct the wake-up receiver to wake up a main transceiver, and n is a positive integer greater than or equal to 1; and
wherein the main transceiver is configured to send a response frame to the second device after being woken up, the response frame indicating whether each of the n wake-up frames is correctly received by the wake-up receiver,
wherein the response frame is a block acknowledgment frame comprising a frame control field, a duration field, a receiver address, a transmitter address, a block acknowledgment control field, a starting sequence control field, a block acknowledgment bitmap field, and a frame check sequence (FCS),
wherein the starting sequence control field comprises a fragment indication field and a starting sequence field,
the starting sequence field or the block acknowledgment bitmap field comprises a segment bitmap for indicating whether each of the n wake-up frames is correctly received by the wake-up receiver, and
the fragment indication field or the block acknowledgment control field comprises a frame type identifier for indicating that the block acknowledgment frame is the response frame; or
wherein the response frame is a data frame comprising a high throughput (HT) control field, wherein the HT control field comprises a very high throughput (VHT) field, a high efficiency (HE) field, and a plurality of control fields, and each of the plurality of control fields comprises a control identifier and corresponding control information, and
wherein the control information comprises the segment bitmap for indicating whether each of the n wake-up frames is correctly received by the wake-up receiver, and
the control identifier comprises a frame type identifier for indicating that the data frame is the response frame.

10. The frame transmission device according to claim 9, wherein each wake-up frame comprises a segment number to indicate an order of the wake-up frame among the n wake-up frames.

11. The frame transmission device according to claim 9, wherein each wake-up frame comprises a segment indication identifier to indicate whether n is equal to 1.

* * * * *